3,794,654
TETRANICOTINOYL-TRIS(HYDROXYMETHYL)-
AMINOMETHANE
Bernt Jabes Lindberg and Sven Gunnar Kronberg, Uppsala, Sweden, assignors to Pharmacia Aktiebolag, Uppsala, Sweden
No Drawing. Continuation of abandoned application Ser. No. 841,965, July 15, 1969. This application Apr. 25, 1972, Ser. No. 247,465
Int. Cl. C07d 31/44
U.S. Cl. 260—295.5 A    1 Claim

ABSTRACT OF THE DISCLOSURE

The present invention relates to a new chemical substance consisting of tris(hydroxymethyl)-aminomethane and nicotinoyl esters thereof wherein the number of ester bound nicotinoyl groups ranges from 0–4 or mixtures thereof. The substances are prepared by reacting one equivalent of tris(hydroxymethyl)-aminomethane with 1–4 equivalents of nicotinoylchloride.HCl in the presence of an acid binding agent such as dry pyridine. The properties of these substances when taken internally are cholesterol lower agents and circulation promotion agents. When applied topically these substances improve circulation.

---

This is a continuation of application Ser. No. 841,965, filed July 15, 1969, now abandoned.

This invention relates to a new chemical substance consisting of new derivatives of nicotinic acid or a mixture of such derivatives, which may be illustrated by the Formula I

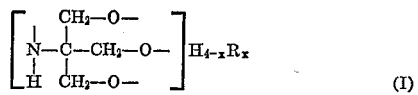

(I)

wherein R represents a nicotinoyl group

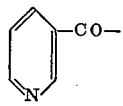

and $x$ designates the number of substituents R in tris(hydroxymethyl)-aminomethane of the formula

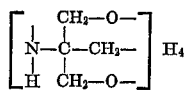

in which $x$ is a number from 1 to 4, or physiologically acceptable salts thereof.

Preferably, compounds of the Formula I above are chosen in which a nicotinoyl group is bound to the nitrogen atom (i.e., a nicotinoyl group being substituted for a hydrogen atom at the nitrogen atom of tris(hydroxymethyl)-aminomethane) and wherein the number of ester-bound nicotinoyl groups is varied from 0 to 3 (0 or 1 or 3, for instance). The following are examples of valuable compounds:

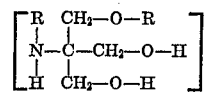

and

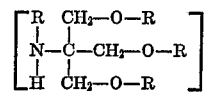

in which R has the significance given above. The lower degree of substitution is chosen when more hydrophilic properties are desired, and the higher degree of substitution is chosen when more lipophilic properties are desired.

If the new chemical substance is a mixture of two or more of the aforesaid derivatives, an analysis of the chemical substance gives a value of $x$ which is not necessarily an integer. Also in this case a nicotinoyl group is preferably amide-bound to the nitrogen atom. Then $x$ suitably is a number of approximately 2 (within the range 1.6 to 2.4 for instance) when more hydrophilic properties are desired and, suitably, in the neighborhood of 4 (within the range 3.6 to 4, for instance) when more lipophilic properties are desired.

As salt formers to form physiologically acceptable salts, acids such as hydrochloric, sulfuric or other acids capable of forming non-toxic salts may be used. When the compounds are obtained in the form of difficulty crystallizable oils, it may be at times especially suitable to convert them into salts. It has been found that the new derivatives possess strongly hyperemizing properties when applied to the skin, which may be demonstrated, for instance, by means of an infrared camera. They may also be used for oral application. According to the invention, the nicotinic acid may be both amide-bound and ester-bound in the new derivatives. Preferably, derivatives having both amide-binding and ester-binding are chosen. (Amide bonds are hydrolyzed by amidases and ester bonds are hydrolyzed by esterases in the body.) The mode of action of the derivatives is that on hydrolysis they liberate the nicotinic acid whereby, on account of the fact that the nicotinic acid is bound, a protracted action thereof is obtained which does not result in any side effect in the form of erythema but may, on the other hand, result in a rather high and sustained concentration of nicotinic acid in the blood. The derivatives may be applied internally as cholesterol lowering agents and as generally circulation promoting substances. When, for example, carrying out tests on dogs applying a single dosage of the novel derivatives perorally, there is obtained a considerably higher nicotinic acid level in the blood than when administering an equivalent dose of hexanicotinoylinositol, both initially and subsequently. The initial level is lower than that obtained when administering an equivalent dose of nicotinic acid, and the concentration thereof in the blood decreases more slowly than when nicotinic acid is administered. As a result hereof, it is possible to maintain a suitable, high level of nicotinic acid in the blood for a long period, without risk of the subject becoming flushed, in contrast to what is caused by unbound nicotinic acid as a result of the high initial level. If the derivatives are applied to the skin, the circulation of blood in the skin is increased. It has been found that the action of the derivatives is protracted and that they are of low toxicity. The new derivatives may be used in the form of various administration forms such as tablets for oral use or in the form of ointments for external use.

By selecting a derivative or derivates of nicotinic acid in which the nicotinoyl group is amide-bound as well as ester-bound, a suitable rate of liberation is obtained which may be adapted to various types of application by varying the proportion of amide-bound and ester-bound nicotinic acid in the derivative or mixtures of such derivatives.

The invention also relates to a method of preparing said new derivatives of nicotinic acid, which comprises reacting 1 mole of tris-(hydroxymethyl)-aminomethane of the above formula with $x$ moles of an acylating agent containing the group R, and recovering the resulting compounds of Formula I as such or in the form of a physiologically acceptable salt.

If only the hydroxyl groups are desired to be acylated, according to a modification of the above method tris-(hydroxymethyl)-nitromethane of the Formula II

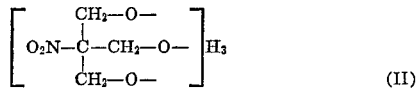
(II)

may be reacted with $y$ moles of said agent for introducing said group R to form a compound of the Formula III

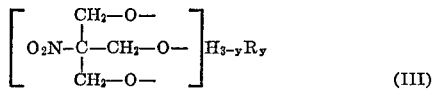
(III)

in which $y$ is a number from 1 to 3, and the resulting compound of Formula III hydrogenated into a compound of the Formula IV

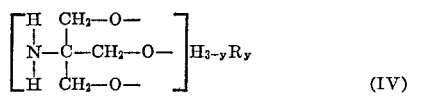
(IV)

If, preferably, a fewer number of the active hydrogen atoms of said tris(hydroxymethyl)-aminomethane or tris-(hydroxymethyl)-nitromethane are desired to be acylated with nicotinoyl groups, according to a modification of the above method one or more of these hydrogen atoms may be substituted with a protecting group which is removed after the reaction. Examples of such protecting groups are acetal groups.

If a compound having only an amide-bound nicotinoyl group is desired, said derivatives having both amide-bound and ester-bound nicotinoyl groups may be subjected to hydrolysis under conditions such that only the ester bonds are hydrolyzed, e.g., by partial alkaline hydrolysis.

As examples of acylating agents containing the group R preferably nicotinoyl halides such as the chloride and bromide; nicotinic anhydride; mixed anhydrides of nicotinic acid; and nicotinic esters such as, for instance, the methyl ester, may be used.

Reactive nicotinic acid derivatives may also be formed directly in the reaction vessel, e.g. by adding phosphorus oxychloride to a solution of nicotinic acid in a suitable organic solvent such as pyridine.

The following examples are given as an illustration of the method of this invention and are not to be taken as limiting the scope or extent of the invention.

EXAMPLE 1

Reaction of 1 equivalent of tris(hydroxymethyl)-aminomethane and 2 equivalents of nicotinoylchloride hydrochloride 30.2 g. (0.25 mole) of tris(hydroxymethyl)-aminomethane are suspended in 100 ml. of chloroform. A solution of 89 g. (0.5 mole) of nicotinoylchloride hydrochloride, 50 ml. of dry pyridine and 200 ml. of chloroform is added dropwise, while stirring, and under protection against the influence of air moisture. The reaction mixture is refluxed for 24 hours. The chloroform is then distilled off and the residue dissolved in 250 ml. of water. The aqueous solution is neutralized to pH 7. A yellow oil separates which is isolated and treated with activated charcoal in chloroform. The chloroform is then distilled off and the oil placed in a heating cabinet at 130° C. and is finally dried over paraffin in a desicator. The yield is 69.9 g. of a pale yellow oil.

The IR spectrum shows amide bands, ester bands and faint hydroxyl bands. It was found by analysis of the product that it consisted of a mixture of several components (i.e., derivatives having different values of $x$).

Tris(hydroxymethyl)-aminomethane or nicotinic acid could not be detected in the product.

By gas chromatographic methods three components could be detected. The product is useful for pharmaceutical preparations without separation into its components.

EXAMPLE 2

Reaction of 1 equivalent of tris(hydroxymethyl)-aminomethane and 1 equivalent of nicotinoylchloride hydrochloride 30.2 g. (0.25 mole) of tris(hydroxymethyl)-aminomethane are suspended in 100 ml. of chloroform. A solution of 44.5 g. (0.25 mole) of nicotinoylchloride hydrochloride, 50 ml. of dry pyridine and 200 ml. of chloroform is added dropwise, while stirring and protecting the reaction mixture against moisture. The reaction mixture is refluxed for 24 hours. After evaporating the chloroform the residue is dissolved in 250 ml. of water. The aqueous solution is neutralized to pH 7. A yellow oil separates. The oil is dissolved in chloroform and the solution treated with activated charcoal. After evaporating the solvent the oil is placed in a heating cabinet at 130° C. and then in a desiccator over paraffin. The yield is 33 g. of a yellow oil. The IR spectrum shows ester bands, amide bands and a faint hydroxyl band. A gas chromatographic analysis shows at least three components. After a time the oil crystallizes partly. The crystals are separated from the oil and recrystallized from benzene. The melting point of the crystals is 140–142° C. An elemental analysis of the crystals showed that $x$ is 4.

*Analysis.*—Calcd. for $x=4$ (percent): C, 62.1; H, 4.3; N, 13.0. Found (percent): C, 62.1; H, 4.4; N, 12.9.

Neither the oil nor the crystals contained tris(hydroxymethyl)-aminomethane or nicotinic acid.

EXAMPLE 3

Tetranicotinoyl-tris(hydroxymethyl)-aminomethane 71.2 g. (0.4 mole) of nicotinoylchloride hydrochloride are dissolved, while stirring, in 200 ml. of dry pyridine. The temperature of the reaction mixture is rising by approximately 30°. Then 12.1 g. of tris(hydroxymethyl)-aminomethane are added in portions so that the temperature does not exceed 80° C. After completed addition of tris(hydroxymethyl)-aminomethane the reaction mixture is allowed to stand for 30 minutes at 80° C., while stirring. It is then poured into 400 ml. of ice water containing 12 ml. of 37% hydrochloric acid, the pH of the aqueous solution being 4.0. It is then extracted with chloroform and the chloroform stripped from the extract. The evaporation residue is treated with activated charcoal in chloroform and the solvent evaporated. The residue is recrystallized from benzene. Yield: 43.9 g.=81%; melting point: 142.5–144.5° C. An elemental analysis showed that $x$ is 4.

*Analysis.*—Calcd. for $x=4$ (percent): C, 62.1; H, 4.3; N, 13.0. Found (percent): C, 62.1; H, 4.4; N, 12.9.

EXAMPLE 4

Tetranicotinoyl-tris(hydroxymethyl)aminomethane 60.5 g. (0.5 mole) of tris(hydroxymethyl)-aminomethane are added in portions to a mixture of 400 ml. of pyridine, 1000 ml. of chloroform and 356 g. (2 moles) of nicotinoylchloride hydrochloride. The reaction mixture is refluxed for 24 hours, while stirring, whereupon the solvent is evaporated. The residue is dissolved in 500 ml. of water containing a small amount of ice. The mixture is then stirred vigorously until a solid separates, the pH being 4.2. The precipitate is washed carefully with water and collected by filtration. After drying in vacuum at 25° C. it is recrystallized from benzene. Yield: 163 g. =60%; melting point: 142–144° C. An elemental analysis showed that $x$ is 4.

*Analysis.*—Calcd. for $x=4$ (percent): C, 62.1; H, 4.3; N, 13.0. Found (percent): C, 61.7; H, 4.4; N, 12.9.

EXAMPLE 5

Tetranicotinoyl-tris(hydroxymethyl)-aminomethane 17.8 g. (0.1 mole) of nicotinoylchloride hydrochloride are dissolved in 100 ml. of dried pyridine with agitation and under protection against the influence of the air moisture. 2.0 g. (0.016 mole) of tris(hydroxymethyl)-aminomethane are added, the temperature rising to the boiling temperature of pyridine. The mixture is refluxed for 60 min. and is then cooled to 0° C. The precipitated pyridine hydrochloride is filtered off and the mother liquor is treated with water and concentrated hydrochloric acid to pH 7. The aqueous solution is extracted with ethyl acetate. The organic phase is dried over magnesium sulphate and then treated twice with active carbon. The ethyl acetate is evaporated and the residue is recrystallized from ethyl acetate. Yield: 4.8 g.=55%, melting point: 141–143° C.

*Analysis.*—Calcd. for $x=4$ (percent): C, 62.1; H, 4.3; N, 13.0. Found (percent): C, 61.9; H, 4.4; N, 12.7.

NMR spectrum of the substance shows that no hydroxyl group is present and the number of aromatic protons corresponds to $x$ being equal to 4.

Thus, both elemental and spectral analysis shows that $x$ is 4.

EXAMPLE 6

Tetranicotinoyl-tris(hydroxymethyl)-aminomethane 12.1 g. (0.1 mole) of tris(hydroxymethyl)-aminomethane and 49.5 g. (0.4 mole) nicotinic acid are suspended in 160 ml. of dried pyridine. Under protection against the influence of the air mositure, agitation and moderate cooling, there are added 71 g. (0.4 mole) benzenesulphenylchloride in a dropwise manner within 40 min. The mixture is then heated to 115° C. for 60 min. After cooling, the reaction mixture is poured out in 400 ml. of ice water with 12 ml. of conc. hydrochloric acid. The aqueous solution is extracted with chloroform. The chloroform solution is dried with magnesium sulphate and then treated with active carbon. The solvent is evaporated and the residue is recrystallized from benzene. Hydrolysis of the obtained product shows a content of nicotinoyl groups which corresponds to $x$ being equal to 3.4.

EXAMPLE 7

N-nicotinoyl-tris(hydroxymethyl)-aminomethane 10.8 g. (0.02 mole) of tetranicotinoyl-tris(hydroxymethyl)-aminomethane are mixed with 50 ml. of 1 N NaOH and the resulting mixture stirred for 3.5 hours. Then the pH of the solution decreases rapidly to 9.3 for which reason 2 N NaOH is added continuously to maintain the pH above this value. After neutralization with hydrochloric acid to pH 7 the water is evaporated, whereupon the residue is shaken with ethanol. 250 ml. of nitromethane are then added to the ethanolic solution. The sodium chloride formed is filtered off and the solvent evaporated from the mother liquor. The residue is recrystallized from n-butanol. The IR spectrum shows hydroxyl and amide bands but no ester band. Yield: 1.4 g.=31%; melting point: 154.5–156.0° C. An elemental analysis and the NMR-spectrum showed that $x$ was 1, and that the compound was N-nicotinoyl-tris(hydroxymethyl)-aminomethane.

*Analysis.*—Calcd. for $x=1$ (percent): C, 53.1; H, 6.2; N, 12.4. Found (percent): C, 53.2; H, 6.3; N, 12.4.

What we claim is:
1. A compound of the formula:

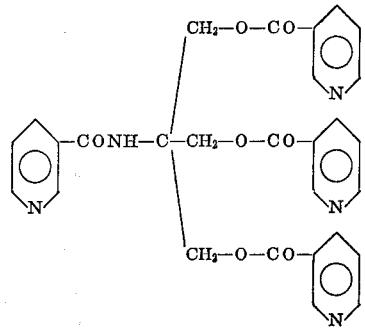

and physiologically acceptable salts thereof.

References Cited

UNITED STATES PATENTS

| | | | |
|---|---|---|---|
| 3,106,562 | 10/1963 | Ekenstam | 260—295.5 |
| 3,384,642 | 5/1968 | Nakanishi et al. | 260—295.5 |

FOREIGN PATENTS

| | | | |
|---|---|---|---|
| 19,064 | 4/1966 | Japan | 260—295.5 |

ALAN L. ROTMAN, Primary Examiner

U.S. Cl. X.R.

260—295.5 R; 424—266